(12) United States Patent
Prestandrea et al.

(10) Patent No.: US 6,254,233 B1
(45) Date of Patent: Jul. 3, 2001

(54) WIDE-ANGLE VIEW EYEGLASSES

(75) Inventors: Anthony Prestandrea, P.O. Box 1044, Miller Place, NY (US) 11764; Paul Ruben, Penfield, NY (US)

(73) Assignee: Anthony Prestandrea, Miller Place, NY (US)

( * ) Notice: Subject to any disclaimer, the term of this patent is extended or adjusted under 35 U.S.C. 154(b) by 0 days.

(21) Appl. No.: 09/416,788

(22) Filed: Oct. 13, 1999

Related U.S. Application Data

(60) Provisional application No. 60/148,820, filed on Aug. 13, 1999.

(51) Int. Cl.[7] ........................................................ G02C 7/08
(52) U.S. Cl. ................................................ 351/57; 351/41
(58) Field of Search ................................ 351/41, 47, 57, 351/158

(56) References Cited

U.S. PATENT DOCUMENTS

| | | | |
|---|---|---|---|
| Re. 33,311 | * 8/1990 | Wilkins | 351/41 |
| 2,184,018 | 12/1939 | Ort | 351/212 |
| 2,380,837 | 7/1945 | Gray | 99/24 |
| 2,537,047 | 1/1951 | Gatten | 35/159 |
| 3,463,570 | 8/1969 | Ratliff | 350/133 |
| 3,572,931 | * 3/1971 | Adler | 351/47 |
| 4,155,626 | 5/1979 | Grech | 350/145 |
| 5,537,254 | 7/1996 | Ruben | 359/682 |
| 5,997,138 | * 12/1999 | Suiter | 351/43 |

* cited by examiner

*Primary Examiner*—Huy Mai
(74) *Attorney, Agent, or Firm*—Alfred M. Walker

(57) ABSTRACT

The present invention relates to a wide-angle view binocular device to enable persons sitting in an area requiring wide viewing angles, such as in a movie theater or in a sports arena, to see images at the peripheral edges as clearly as those images viewed straight ahead, with minimal barrel distortion of the viewer's field of view.

18 Claims, 6 Drawing Sheets

FIG.4A
LENS-1
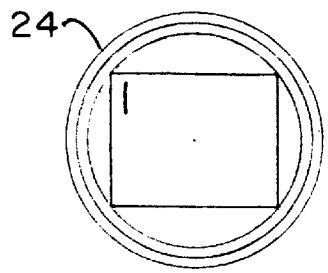
FIG.4B
LENS-1
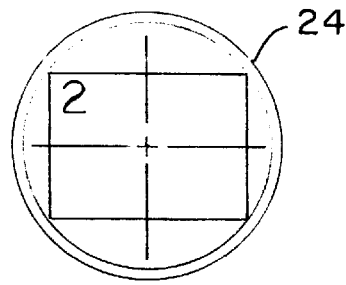
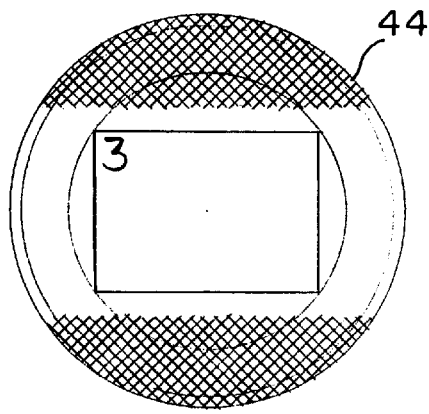
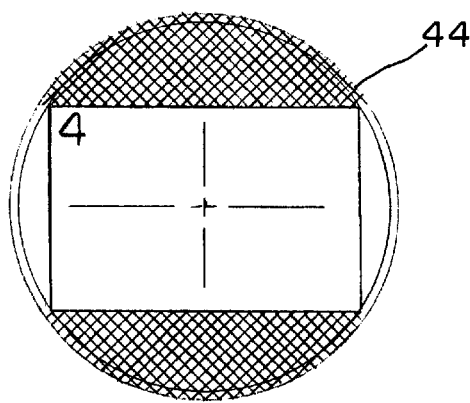
FIG.5A
LENS-2
FIG.5B
LENS-2
| ALL DIMS IN MILLIMETERS | | | | |
|---|---|---|---|---|
| LENS # | SURF # | C.T. | RADIUS | CONIC. |
| 1 | 1 | 5.90 | -854.81 | |
| | 2 | | 20.974 | |
| 2 | 3 | 2.00 | 7.823 | -.7509 |
| | 4 | | 181.50 | |
FIG.6

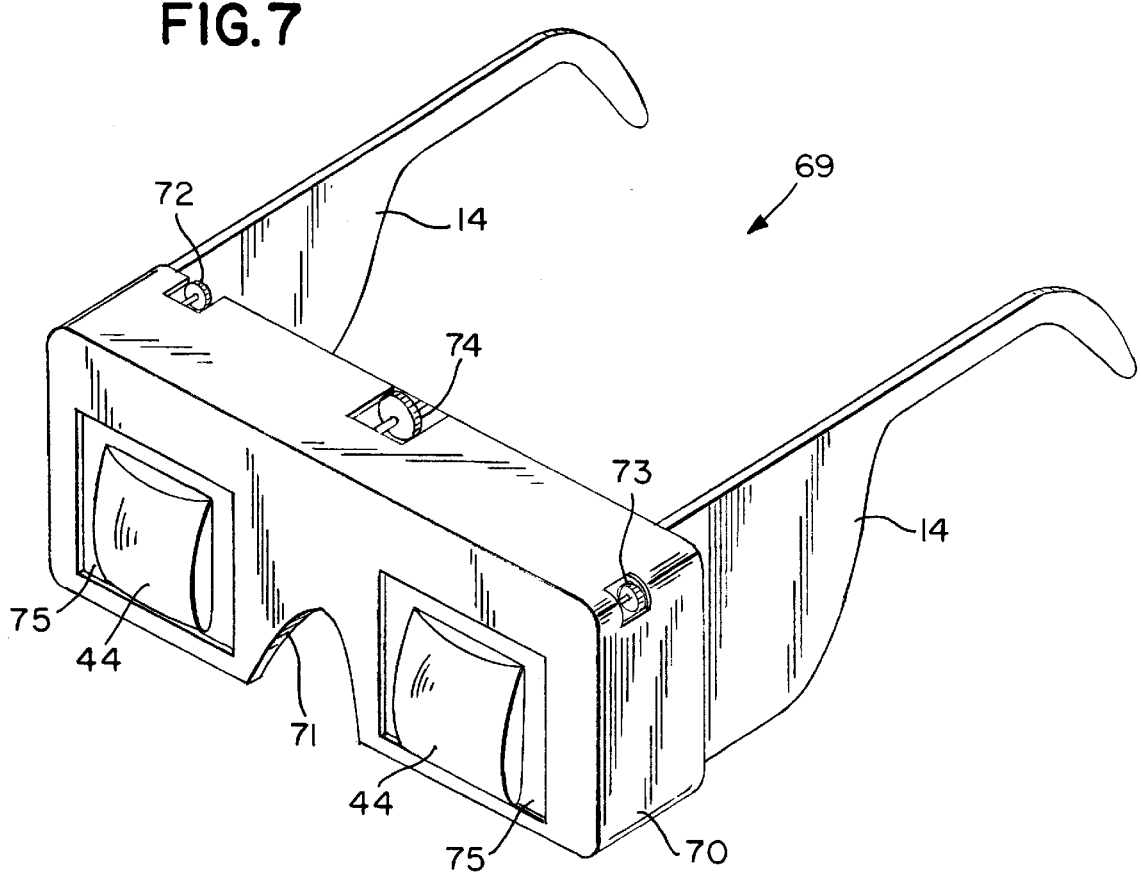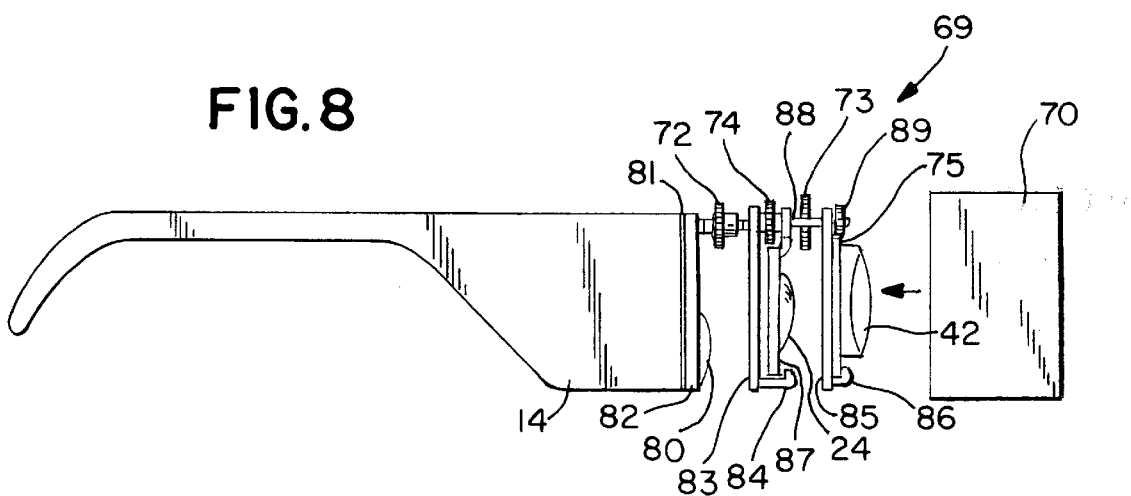

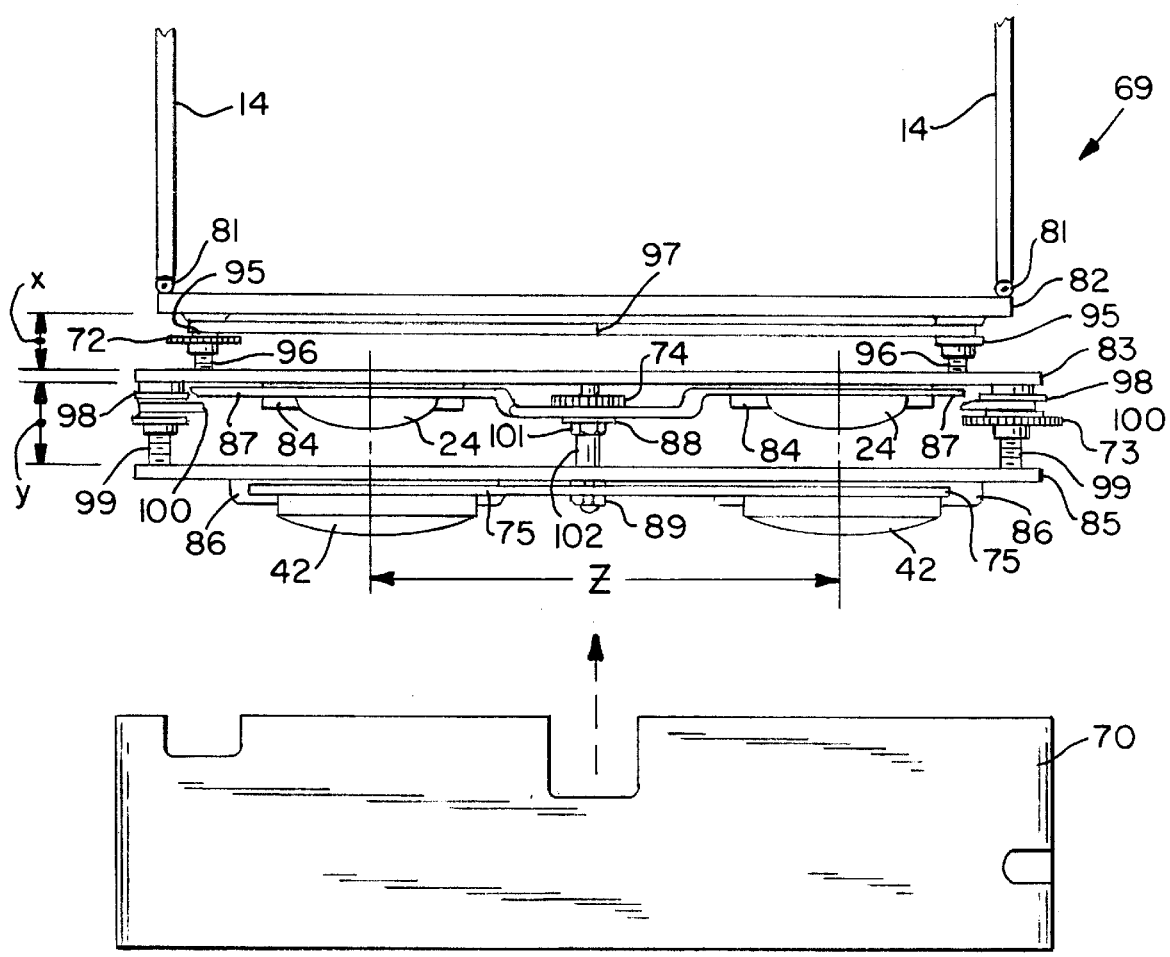

WIDE-ANGLE VIEW EYEGLASSES

This Application claims the benefit of Provisional No. 60/148,820 filed Aug. 13, 1999.

FIELD OF THE INVENTION

The present invention relates to a wide-angle view eyeglasses to enable persons sitting in an area requiring wide viewing angles, such as in a movie theater or in a sports arena, to see images at the peripheral edges more clearly and with less eye motion than without an optical system.

BACKGROUND OF THE INVENTION

Various attempts have been made to increase the viewing comfort of moviegoers. Among these patents include U.S. Pat. No. 2,380,837 of Gray which describes a modified interior design of a movie theater where the film is projected onto a high screen, so that the viewers view the movie in a reclining position.

In addition, U.S. Pat. No. 2,537,047 of Gatten discloses a wide-angle pair of glasses that increases a user's field of vision by providing a pair of wrap around lenses that are both in front of and at the side of the viewer's eyes. The lens curves around the viewer's face.

U.S. Pat. No. 4,155,626 of Grech describes a therapeutic viewing device with two pairs of lens with discontinuous surfaces. The lenses therein have curved surfaces interrupted by flat medial portions. The lenses only affect vision at the peripheral, non-medial portions. Grech '626 is primarily designed for persons with pathological tunnel vision, and it is not specifically for use by persons with normal vision in-seats close to the screen in movie theaters.

Grech '626 does not modify the normal mid viewing portions of the lenses for persons with pathological tunnel vision. Grech '626 only modifies and expands upon the peripheral vision portions, which are deficient in persons with pathological tunnel vision.

In contrast, for the general movie viewing public in close proximity (i.e. 30 feet or less) to a movie screen, producing discontinuous lenses which do not modify the mid viewing portion of the lenses is counterproductive in an overall method of uniformly minifying the wide screen view to a movie viewer with normal vision.

OBJECTS OF THE INVENTION

An object of this invention is to provide a wide-angle view eyeglasses for wide-angle viewing.

Another object of this invention is to provide an optical means for conveying a wider-than-normal view into a user's field of vision, with minimal barrel distortion of the user's field of vision.

Another object of this invention is to provide a means for blocking a user's peripheral vision.

Another object of this invention is to provide better viewing images for the general movie-viewing public in close proximity to a movie screen.

Another object of this invention is to provide ergonomically designed multi-user wide-angle eyeglasses.

It is yet another object of this invention to provide wide-angle view eyeglasses, which are optionally adjustable for the viewer.

It is yet another object of the present invention to improve over the disadvantages of the prior art.

SUMMARY OF THE INVENTION

In keeping with these objects and others which may become apparent, the present invention is a wide-angle pair of eyeglasses that increase a user's field of vision with minimal barrel distortion by providing a double set of lenses that are in front of the viewer's eyes, for use by persons with normal vision in seats close to the screen in movie theaters.

The present invention minifies the wide screen view to a movie viewer with wide-angle view eyeglasses, including a face-fitting optical frame for transverse deployment across the face of a user.

A pair of rearwardly projecting temple pieces has vertically disposed light-excluding surfaces respectively attached to the ends of the optical frame. These temple pieces comfortably grasp the ears of a user.

The optical frame includes an optical means that conveys a wider-than-normal view into a user's field of vision.

To achieve the wide-angle viewing, the optical means of the wide-angle view eyeglasses includes a lens system having at least two optically aligned and longitudinally spaced-apart lenses with continuous surfaces, for each of the user's eyes.

Preferably the lenses are made of glass or plastic, such as but not limited to, styrene or acrylic plastics.

An optical bridge includes an inner bridge disposed transversely across the face of a user, and the inner bridge includes a pair of transversely spaced-apart inner lens mounting receptacles that support a pair of inner lenses. This inner bridge has a mounting member projecting outwardly therefrom.

The inner bridge is connected to and spaced longitudinally apart from an outer bridge that is parallel to the inner bridge and is farther away from the face of the user. The outer bridge includes a pair of transversely spaced-apart outer lens mounting receptacles for receiving a pair of outer lenses.

These inner lenses and outer lenses are optically aligned with the eyes of a user.

The design of the lenses may vary, but one particular design calls for a slightly convex inner lens surface of the inner lens (such as, for example, with about a −854.81 mm radius), an outward convex surface (such as, for example, with about a 20.9728 mm radius) on the same lens, an outer lens with an aspheric inner contour and with an outward surface which is convex. The aspheric surface reduces barrel distortion. The other lens surfaces may be spherical.

In a preferred embodiment, the aspheric surfaces are derived from conic sections and are ellipsoidal, although in certain circumstances other aspheric surfaces, such as paraboloids and hyperboloids may be used.

Preferably the aspheric curvature as defined by its sag surface "z" is measured along the optical axis of rotation, extending through the center of the lenses, according to the following formula:

$$z = \frac{(cv)(y^2)}{1 + \sqrt{1 - (cv)^2 (K+1) y^2}},$$

where curvature cv=1/R=1/7.823, where y=distance of the surface measured perpendicular to the optical axis of the lens and, where K=conic constant=−0.7509.

where R=radius of curvature.

While in this preferred embodiment, the inner surface of each outer lens is aspheric, another modification may include both inner and outer surfaces on the outer lenses being aspheric, while the inner and outer surfaces of the inner lenses are spherical. In other embodiments, one or more of the lens surfaces may be aspheric, or in another optional embodiment all of the lens surfaces may be spherical.

A simple first embodiment is a pair of non-adjustable custom designed wide-angle glasses for an individual. In this embodiment, the lenses are not movable.

A second embodiment is an adjustable pair of multi-user glasses with adjustments to accommodate interpupilary spacing or distance variations, pupil size variations, and mild focus deficiencies. In this embodiment, the pairs of lenses focused on each eye are movable in unison in positional register with each other, but are movable nonetheless, either transversally laterally for persons with widely spaced eyes, or, movable in unison in positional register back and forth to minor focusing adjustments. However, in a preferred embodiment the inner lenses are movable in unison. In any case, both lenses for each eye are aligned.

Therefore, the respective inner and outer lens pairs are aligned in unison for each respective eye. Consequently, one can only move the inner lenses laterally if the outer lenses are also moved a corresponding distance laterally in positional register with the inner lenses, to keep the light beam of the passing within the eyes of the user.

In addition, the temple pieces have optional wide front or side portions for blocking a user's peripheral vision, such as vertically disposed light-excluding surfaces of a completely opaque material having a vertically disposed light-excluding surface.

Moreover, with the aforesaid optical minification system, the viewer's angular field of view is wide, lying between about 85 and 90 degrees of arc.

BRIEF DESCRIPTION OF THE DRAWINGS

The present invention can best be described in conjunction with the following drawings, in which:

FIGS. 4A and 4B are front elevational views of the respective inner and outer surfaces of an inner lens of the lens portion of the wide-angle view eyeglasses as in FIG. 1;

FIGS. 5A and 5B are front elevational views of the respective inner and outer surfaces of an outer lens of the wide-angle view eyeglasses as in FIG. 1, wherein the surfaces are viewed from the direction of the eye of the user;

FIG. 6 is a table describing the design parameters of a particular design of lenses for the wide-angle view eyeglasses of the present invention;

FIG. 7 is an isometric view of an alternate embodiment for an optional multi-user adjustable wide-angle glasses of the present invention;

FIG. 8 is a side elevational view of the optionally adjustable wide-angle glasses of FIG. 7;

FIG. 9 is a top elevational view of the optionally adjustable wide-angle glasses of FIG. 7;

DETAILED DESCRIPTION OF THE INVENTION

Figure 1:
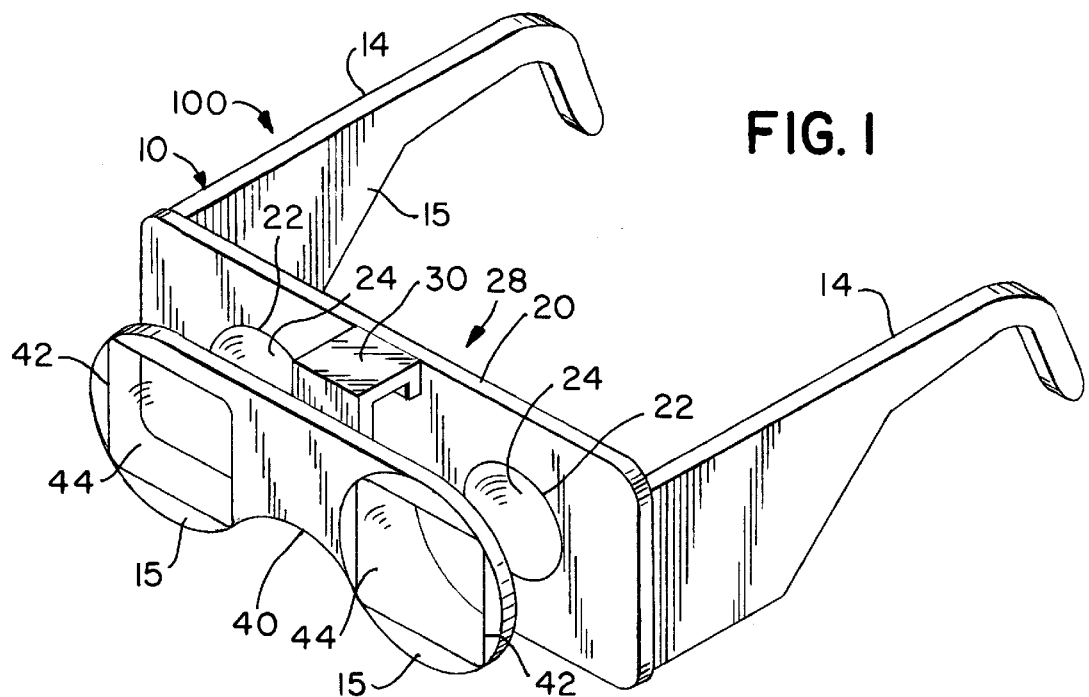
FIG. 1 is a perspective view of the wide-angle view eyeglasses of the present invention.
Figure 2:
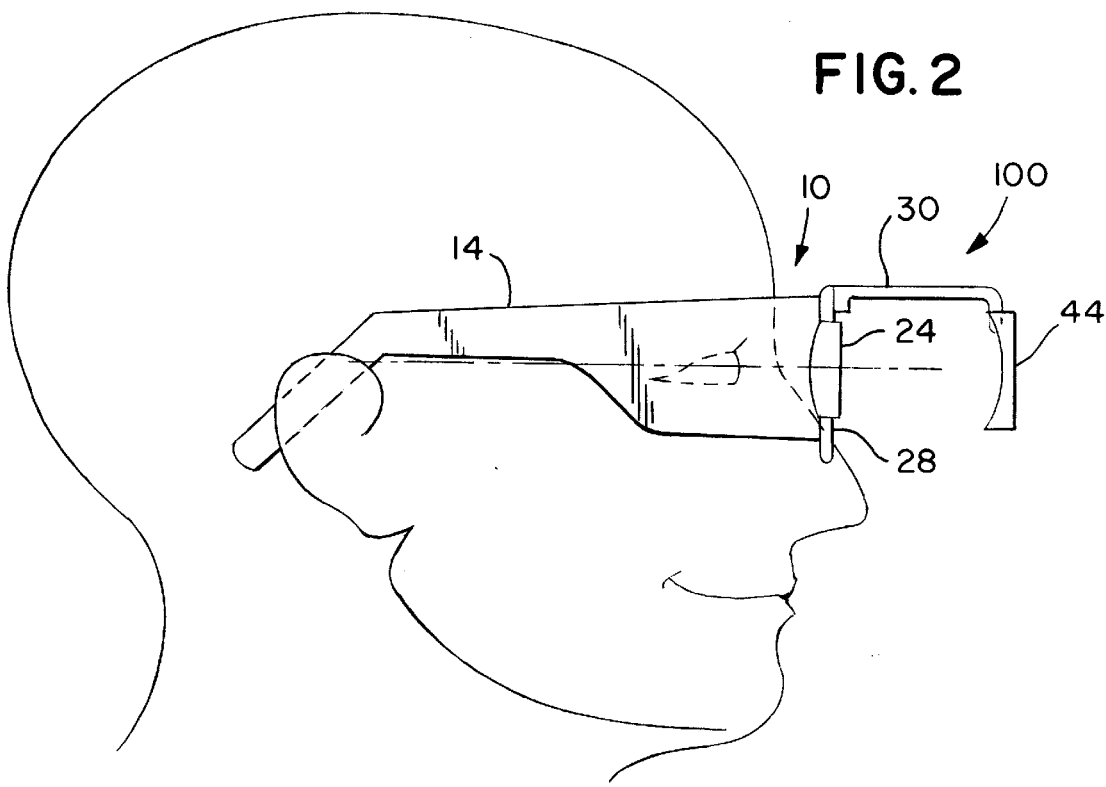
FIG. 2 is a side elevational view of the wide-angle view eyeglasses as in FIG. 1, shown in position upon a user.

As shown in FIGS. 1–12, wide-angle view eyeglasses 100 for wide-angle viewing of images, such as sports games or films from close up at a movie theater, include a face-fitting optical frame 10 for transverse deployment across the face of a user, and a pair of rearwardly projecting temple pieces 14 having optional vertically disposed light-excluding surfaces 15 respectively attached to the ends of optical frame 10. Temple pieces 14 comfortably grasp the ears of a user.

Optical frame 10 has an optical means for conveying a wider-than-normal view into a user's field of vision.

This optical means includes a lens system, having at least two optically aligned and longitudinally spaced-apart lenses with continuous surfaces for each of the user's eyes, such as inner lenses 24 and outer lenses 44. Each pair of inner lenses 24 and outer lenses 44 are optically aligned, respectively, with each respective eye of a user.

An optical bridge includes an inner bridge 20 disposed transversely across the face of a user. Inner bridge 20 has a pair of transversely spaced-apart inner lens mounting receptacles 22 for receiving the pair of inner lenses 24. Likewise, outer bridge 40 includes a pair of transversely spaced-apart outer lens mounting receptacles 42 for receiving the pair of outer lenses 44.

Inner bridge 20 includes mounting means 30 projecting outwardly therefrom, and inner bridge 20 is connected to, and is spaced longitudinally apart from, an outer bridge 40 disposed parallel to inner bridge 20. Inner bridge 20 has a nose channel 28 for contacting the nose of a user and for stabilizing face-fitting optical frame 10 on the face of a user.

Although mounting means 30 may be non-movable, in a preferable optional embodiment, both inner bridge 20 and outer bridge 40 may be connected by user-adjustable longitudinal spacing means 60 within mounting means 30, such as a ratchet or the like.

Figure 3A:
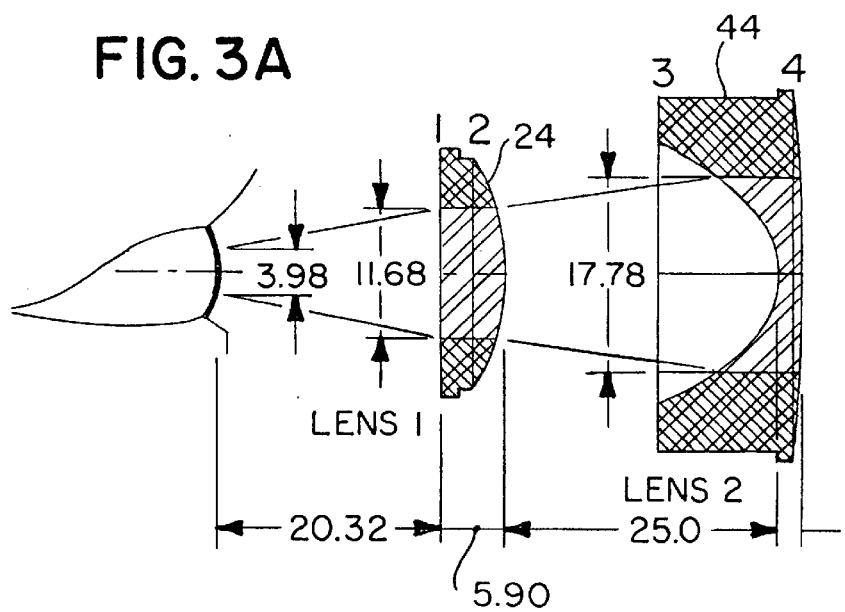
FIG. 3A is a sectional view of the lens portion thereof.

FIGS. 3A, 4 and 5 show an example of a preferable optical configuration of the two lens pairs 24 and 44.

The table of FIG. 6 summarizes the preferable configuration parameters. The unused portions of the lenses are shown as crosshatched sections. These portions of lenses 24 and 44 may be actually cut away. The position of the lenses as well as their size and curvature are about 4 mm with perfect vision. Inner lens 24's inner surface 1 is preferably slightly convex, and its outer surface 2 is preferably convex. Outer lens 44's inner surface 3 is preferably aspheric, while its outer surface 4 is preferably slightly convex. This particular lens configuration, with an aspheric inner surface 3 of outer lens 44, minimizes barrel distortion. The other lens surfaces 1, 2 or 4 may be spherical.

As further shown in FIGS. 3 and 6, inner lenses 24 closest to the eyes of the users have a transverse diameter of about 21.08 mm, and outer lenses 44 farthest away from the eyes of the users have a transverse diameter of about 32.23 mm. However, optionally at least 2.0 mm is added to each lens (1.0 mm on each side) during optical molding, to insure that the respective lens' surfaces are usable out to the edge of the preferred clear apertures of each lens.

The slightly convex lens surface 1 disposed facing inwardly toward the eye of a user of inner lenses 24 closest to the eyes of the users preferably has a curvature radius of about −854.81 mm.

The lens surface 2 disposed facing outwardly away from the eye of a user of inner lenses 24 closest to the eyes of the users has a curvature radius of about 20.97 mm.

Outer lenses 44 farthest away from the eyes of the users preferably has a concave inner surface 3 having a curvature radius of about 7.823 mm and a conic constant of −0.7509.

While aspheric surface 3 is preferably an ellipsoid with a conic section of between 0 and −1, preferably −0.75, it may be a paraboloid with a positive conic section greater than 0 or a hyberoloid with a conic section of −1.1 or greater.

Outer surface 4 of outer lens 44 has a curvature radius of about 181.5 mm.

Figure 3B:
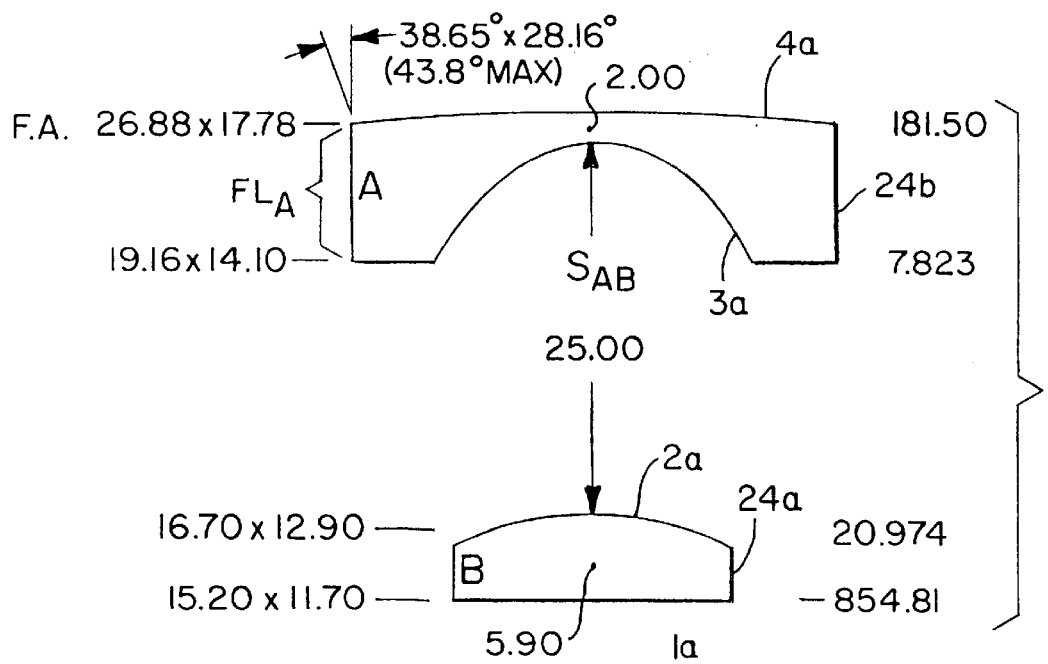
FIG. 3B is an exploded diagrammatic top view of the lens portions thereof.

Another important measurement of the outer lens 44 is that the ratio of its focal length $F_A$, as shown in FIG. 3B, divided by the space AB between lenses 24 and 44 (as measured along the optical axis) is preferably between −0.64 and −0.68.

Furthermore, the focal length $F_A$ of outer lens 44 is preferably about −16.63 mm and the focal length $F_B$ of inner lens 24 is 41.64 mm. Therefore, the ratio value of $F_B/F_A$ is greater than −2.3 or less than −2.7, when the ratio of $F_A$ divided by space $S_{AB}$ is between −0.64 and −0.68.

In addition, the curvature radius of inner lens 24 is between infinity and −426.72 mm, preferably about −854.81 mm, where the minus sign designates the center of curvature away from the eye of the user.

While it is possible to construct an embodiment with lens having surfaces, which are only spherical in nature, preferably at least inner surface 3 of outer lenses 44 farthest away from the eyes of the user is an aspheric surface so as to minimize barrel distortion of the field of view of the viewer. In other optional embodiments, however, it is possible that one or more of the respective lens surfaces 1, 2 and/or 3 may be aspheric, as long as at least one of the surfaces 1, 2 or 3 is aspheric. The other surfaces be aspheric or spherical.

The wide-angle view eyeglasses may also have a means for blocking a user's peripheral vision.

This optional means for blocking a user's peripheral vision through the pair of rearwardly projecting temple pieces 14 includes optionally constituting vertically disposed light-excluding surfaces 15 of a completely opaque material having a vertically disposed light-excluding surface of about 50.8 mm in width. The light excluding surfaces 15 are also preferably provided around the outer lenses 44 in outer lens receptacle 42. Light-excluding surfaces 15 each have a respective hole therein for exposing a portion of each said respective outer lenses therethrough. This means for blocking a user's peripheral vision of the pair of rearwardly projecting temple pieces 14 may also constitutes vertically disposed light-excluding surfaces 15 of black plastic of about 50.8 mm in width, with open spaces for outer lenses 44.

Optionally, peripheral vision may be also blocked by cutting of selected portions of the edges of the respective lenses 24 or 44.

FIG. 7 shows a perspective view of an optional ergonomically designed adjustable multi-user wide-angle glasses 69. this is one embodiment. It is understood that other embodiments for adjustable wide-angle view eyeglasses may be made.

In this embodiment of FIG. 7, housing 70, which blocks light from the sides and top, has a wide nose channel 71. Lateral adjustment wheel 74 adjusts the optical axes of outer lenses 44 as well as inner lenses 24 (not shown) to match the user's interpupillary distance. Portions of a movable subframe 75 holding outer lenses 44 are visible. Adjustment wheel 72 varies the distance from the pupil to the back lenses 24. This should be adjusted to minimize vignetting, which is blocking or shading of a portion of view.

FIGS. 8 through 12 illustrate the various details of this embodiment, which is only one of various adjustable embodiments.

In the side view of FIG. 8, the housing 70 has been moved away to show the inner parts.

The top view of FIG. 9 shows some of the elements, which are obscured in FIG. 8. Hinges 81 attach sidepieces 14 to back frame 82.

Figure 10:
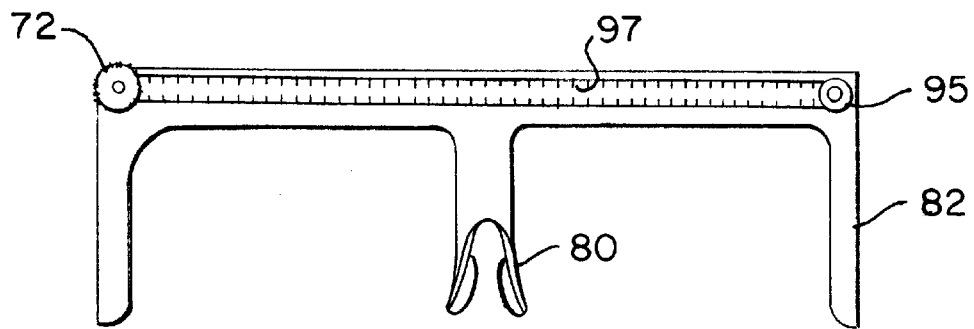
FIG. 10 is a front elevational view of the back frame of the optionally adjustable wide-angle glasses of FIG. 7.

The rearmost subframe 82 (closest to the eyes) is shown in FIG. 10 with adjustable nosepiece 80. A molded miniature timing belt 97 couples two timing belt pulleys which move in a synchronous fashion when knurled adjustment wheel 72 is turned.

In a preferred embodiment, only outer lenses 42 are movable toward or away from the eyes of the user, and inner lenses 24 are fixed relative to their position within eyeglasses 69.

In the alternate version, inner lenses are 24 and also movable forwards and backwards.

Figure 11:
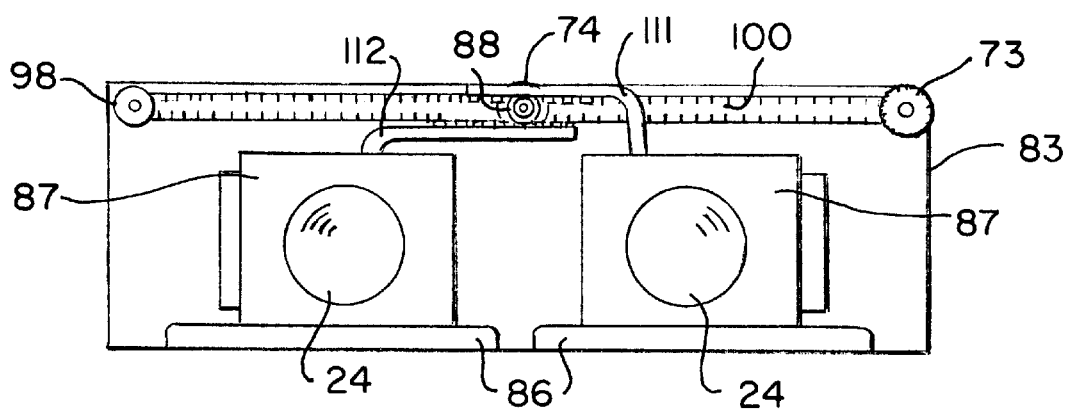
FIG. 11 is a front elevational view of the frame supporting the rear lenses of the optionally adjustable wide-angle glasses of FIG. 7; and, FIG. 12 is a front elevational view of the frame supporting the front lenses of the optionally adjustable wide-angle glasses of FIG. 7.

Threaded studs 96 move in and out of threaded holes within pulleys 95 as desired to adjust the middle subframe 83 which carries lenses 24, as in FIG. 11, closer or farther away from the eyes. This is variable dimension "x" in FIG. 9. Timing belt 100 on pulleys 98 moves threaded studs 99 in and out of threaded holes in pulleys 98 in a synchronous fashion when adjustment wheel 73 is turned. Belt 100 is only partially shown in FIG. 9 for clarity.

Figure 12:
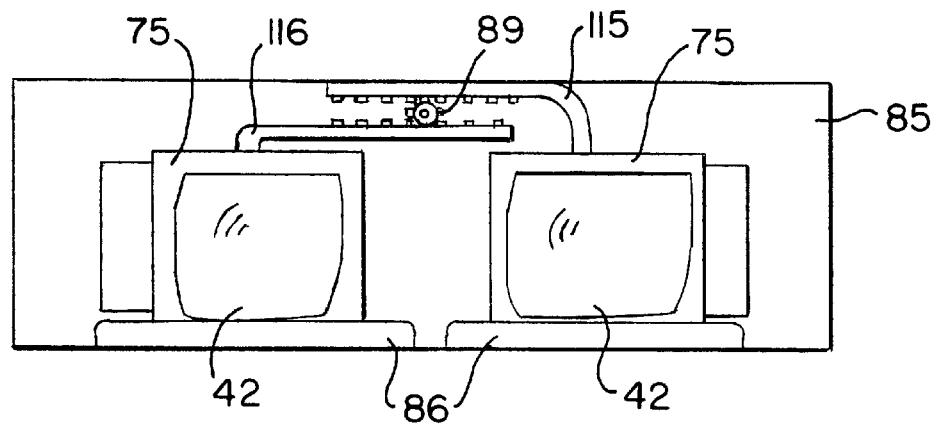

As shown in FIG. 12, this spaces subframe 85 which holds outer lenses 42 from subframe 83 which holds lenses 24; this is variable distance "y" shown in FIG. 9. Adjustment wheel 74 is pivotally attached to frame 83; it drives two telescoping hexagonal cross sectional tubing segments 101 and 102 which transmit the rotary motion to inner pinion gear 88 and outer pinion gear 89 regardless of the positional adjustment of outer frame 85 relative to middle frame 83.

As seen in FIG. 11, pinion 88 moves lens subframes 87 closer or farther apart laterally through engagement with attached rack arms 111 and 112.

Simultaneously, and in positional synchronism, pinion 89 moves lens subframes 75 closer or farther apart laterally through attached rack arms 115 and 116, as in FIG. 12. This is variable dimension "z" in FIG. 9. Guidance rails 84 guide lens subframes 87 while guidance rails 86 guide lens subframes 75. Through the use of timing belts and dual threaded studs, frames 83 and 85 can be moved and supported in such a manner that they remain parallel to each other and to frame 82. The rack and pinion mechanism for lateral lens adjustment keeps the inner and outer lenses laterally aligned throughout their range of adjustment.

Other modifications may be made to the present invention, without departing from the scope of the invention, as noted in the appended Claims.

What is claimed is:

1. Wide-angle view eyeglasses having an optical minification system for wide-angle viewing, with minimal barrel distortion of the viewer's field of view, of a wide screen comprising:

a face-fitting optical frame;

a pair of rearwardly projecting temple pieces attached to said optical frame;

said optical frame having optical means for conveying a wider-than-normal view into a viewer's field of vision, wherein said optical means comprises a minification lens system, said lens system comprising a pair of inner lenses and a pair of outer lenses;

each said pair of inner lenses and outer lenses being optically aligned with a respective eye of the viewer's pair of eyes, each said pair of inner lenses and said pair of outer lenses being longitudinally spaced-apart from each other, and said inner lenses being furthest from said wide screen and said outer lenses being nearest to said wide screen;

each inner lens has continuous, uninterrupted front and rear surfaces thereon facing toward and away from said outer lens, respectively;

each outer lens has a rear surface facing said inner lens and a front surface facing said wide screen; and said lens system has a minification sufficient to obtain an angular field of view of between 85 and 90 degrees of arc.

2. The wide-angle view eyeglasses of claim 1, wherein said rear surface of each of said outer lenses is an aspheric surface.

3. The wide-angle eyeglasses of claim 2 wherein said aspheric surface is a portion of an ellipsoid.

4. The wide-angle view eyeglasses of claim 3, wherein said rear surface of each of said inner lenses is slightly convex with a curvature radius of between infinity and −426.72 mm.

5. The wide-angle view eyeglasses as in claim 4 wherein said curvature of radius of said convex surface is about −854.81 mm, said front surface of each of said inner lenses has a curvature radius of about +20.9728 mm; wherein the plus sign designates the center of curvature towards the eye of the viewer; and, said outer lenses each comprise a concave rear surface having a curvature radius of about −7.823 mm and a front surface having a curvature radius of about 181.5 mm.

6. The wide-angle view eyeglasses as in claim 3 wherein the sag of said aspheric surface, as measured along the optical axis of rotation extending through the center of each of said lenses, is determined by the following formula:

$$z = \frac{(cv)(y^2)}{1 + \sqrt{1 - (cv)^2(K+1)y^2}},$$

where curvature cv=1/R=1/7.823, where y=surface distance as measured perpendicular to the optical axis of the rotation of the lens, and, where K=conic constant=−0.7509.

where R=radius of curvature.

7. The wide angle eyeglasses as in claim 3 wherein the focal length $F_A$ of each outer lens is preferably about −16.63 mm and the focal length $F_B$ of inner lens 24 is 41.64 mm, wherein further the ratio value of $F_B/F_A$ is greater than −2.3 or less than −2.7, when the ratio of $F_A$ divided by space $S_{AB}$ is between −0.64 and −0.68, where $S_{AB}$ is the distance between the outer and inner lenses.

8. The wide-angle view eyeglasses of claim 1, wherein the front and rear surfaces of said inner lenses are portions of a sphere and the rear surface of each of said outer lenses is an aspheric surface.

9. The wide-angle view eyeglasses as in claim 8 wherein each said aspheric surface is a portion of an ellipsoid.

10. The wide-angle view eyeglasses as in claim 1 further comprising an optical bridge including an inner bridge supporting said inner lenses and an outer bridge supporting said outer lenses;

said inner bridge being connected to and spaced longitudinally apart from said outer bridge and disposed parallel to said outer bridge, said inner bridge and said outer bridge being connected by adjustable longitudinal spacing means;

said inner bridge having a nose channel when in use.

11. The wide-angle view eyeglasses of claim 10 further comprising means for calibration of optical alignment.

12. The wide-angle view eyeglasses of claim 11, wherein said means for calibration of optical alignment comprises a pair of adjustable lens frames disposed on inner and outer bridges for sliding of inner lenses toward and away from said outer lenses to a desired position.

13. The wide-angle view eyeglasses of claim 11, wherein said means for calibration of optical alignment comprises a user-adjustable ratchet disposed on said inner bridge for moving of inner lenses.

14. The wide-angle view eyeglasses of claim 11, wherein said means for calibration of optical alignment comprises an adjustable rack-and-pinion system disposed on said inner bridge for moving said inner lenses.

15. The wide-angle view eyeglasses of claim 1, wherein said pair of rearwardly projecting temple pieces have means for blocking peripheral vision.

16. The wide-angle view eyeglasses of claim 1 further comprising front to rear calibration means of optical alignment including a pair of adjustable lens frames disposed on said inner bridge for front to rear sliding of inner lenses together in positional register with outer lenses to a desired frontal position.

17. The wide-angle view eyeglasses of claim 1 further comprising an adjustment mechanism for adjusting said inner lenses and said outer lenses in positional register with each other, said adjustment mechanism comprising a first adjustment wheel adjusting respective optical axes of said outer lenses and said inner lenses.

18. The wide-angle view eyeglasses of claim 17 further comprising each said adjustment wheel being engageable with a respective timing belt moving respective pairs of threaded support members, said support members engageable with pinions moving said pair of inner lenses and said pair of outer lenses in positional register with each other in synchronous fashion when said respective adjustment wheels are turned.

* * * * *